United States Patent
Kondo et al.

(10) Patent No.: US 11,956,028 B2
(45) Date of Patent: *Apr. 9, 2024

(54) TRANSMISSION ANTENNA MODULE, NON-CONTACT TRANSMISSION MODULE, NON-CONTACT COMMUNICATION SYSTEM PROVIDED THEREWITH AND NON-CONTACT COMMUNICATION METHOD

(71) Applicants: HOSIDEN CORPORATION, Yao (JP); KEIO UNIVERSITY, Tokyo (JP)

(72) Inventors: Hayato Kondo, Yao (JP); Kosuke Sasada, Yao (JP); Tadahiro Kuroda, Yokohama (JP)

(73) Assignees: HOSIDEN CORPORATION, Osaka (JP); KEIO UNIVERSITY, Tokyo (JP)

( * ) Notice: Subject to any disclaimer, the term of this patent is extended or adjusted under 35 U.S.C. 154(b) by 201 days.

This patent is subject to a terminal disclaimer.

(21) Appl. No.: 17/200,123

(22) Filed: Mar. 12, 2021

(65) Prior Publication Data
US 2021/0203383 A1 Jul. 1, 2021

Related U.S. Application Data

(63) Continuation of application No. 16/476,701, filed as application No. PCT/JP2017/043237 on Dec. 1, 2017, now Pat. No. 10,992,349.

(30) Foreign Application Priority Data

Jan. 12, 2017 (JP) ................... 2017-003197

(51) Int. Cl.
*H04B 5/48* (2024.01)
*H04B 1/59* (2006.01)
*H04B 17/00* (2015.01)

(52) U.S. Cl.
CPC ............ *H04B 5/48* (2024.01); *H04B 1/59* (2013.01)

(58) Field of Classification Search
CPC .......... H04B 5/0081; H04B 1/59; H04B 5/02; H04B 17/00
See application file for complete search history.

(56) References Cited

U.S. PATENT DOCUMENTS

| 10,992,349 B2 * | 4/2021 | Kondo ............... H04B 5/02 |
| 2008/0119139 A1 * | 5/2008 | Raggam .......... G06K 19/0723 455/47 |

(Continued)

FOREIGN PATENT DOCUMENTS

| JP | 2009268022 A | 11/2009 |
| JP | 2012169513 A | 9/2012 |
| JP | 2016025460 A | 2/2016 |

OTHER PUBLICATIONS

International Search Report (Form PCT/ISA/210) for International Patent Application No. PCT/JP2017/043237, issued from the Japan Patent Office, dated Feb. 27, 2018, 3 pages.

(Continued)

*Primary Examiner* — Jinsong Hu
*Assistant Examiner* — Farideh Madani
(74) *Attorney, Agent, or Firm* — Kilyk & Bowersox, P.L.L.C.

(57) ABSTRACT

A module and system are provided for reducing or suppressing ringing occurring in a digital signal to be transmitted. A transmission module Ma includes a transmitter 200a configured to transmit a digital signal, a transmission antenna 100a constituted by a metal plate, or by a conductor formed on an insulator, the transmission antenna 100a being configured to be electromagnetically or magnetically coupled to a reception antenna 100b of a non-contact reception module Mb for digital communication, and a resistor 400a con- (Continued)

nected in series between the transmitter 200a and the transmission antenna 100a. The resistor 400a has such a resistance value that the resistor 400a entirely blunts a waveform of the digital signal outputted from the transmitter 200a so as to reduce or suppress ringing occurring in the digital signal. The blunted digital signal is to be inputted into the transmission antenna 100a.

8 Claims, 4 Drawing Sheets

(56) References Cited

U.S. PATENT DOCUMENTS

| | | | |
|---|---|---|---|
| 2009/0273418 A1 | 11/2009 | Shimizu et al. | |
| 2010/0289594 A1* | 11/2010 | Bostak | G02F 1/0327 332/185 |
| 2013/0279549 A1* | 10/2013 | Van de Beek | H04L 25/0266 375/219 |
| 2015/0209591 A1* | 7/2015 | Meskens | A61N 1/36036 607/60 |
| 2016/0371580 A1 | 12/2016 | Kunc et al. | |
| 2017/0155194 A1 | 6/2017 | Kanno | |

OTHER PUBLICATIONS

Written Opinion (Form PCT/ISA/237) for International Patent Application No. PCT/JP2017/043237, issued from the Japan Patent Office, dated Feb. 14, 2018, 3 pages.

Communication pursuant to Article 94(3) EPC, for European Application No. EP 17890958.6, published by the European Patent Office (EPO), dated Sep. 10, 2020 (six pages).

Extended European Search Report for European Application No. EP 17890958.6, published by the European Patent Office (EPO), dated Nov. 15, 2019, including corresponding Communication, 6-page EPO from 1703, 1-page Supplementary European Search Report (Form 1503), 1-page Annex, and Information on Search Strategy.

* cited by examiner

TRANSMISSION ANTENNA MODULE, NON-CONTACT TRANSMISSION MODULE, NON-CONTACT COMMUNICATION SYSTEM PROVIDED THEREWITH AND NON-CONTACT COMMUNICATION METHOD

CROSS-REFERENCE TO RELATED APPLICATIONS

The present invention is a continuation of U.S. patent application Ser. No. 16/476,701 filed Jul. 9, 2019, which is a 371 of International Patent Application No. PCT/JP2017/043237 filed Dec. 1, 2017, which in-turn claims priority from Japanese Patent Application No. 2017-003197 filed Jan. 12, 2017, all of which are incorporated herein in their entireties by reference.

BACKGROUND OF THE INVENTION

Technical Field

The invention relates to transmission antenna modules, non-contact transmission modules, non-contact communication systems including the same, and non-contact communication methods.

Background Art

Patent Literature 1 identified below describes a conventional non-contact communication system. The system includes a transmission apparatus and a reception apparatus that communicate with each other in a non-contacting manner. The transmission apparatus includes an antenna resonance part, a transmission part, and a measurement part. The transmission part is configured to transmit differential signals and supply them to the antenna resonance part. The measurement part measures output currents from the transmission part to the antenna resonance part. The antenna resonance part has an antenna coil and an impedance matching part connected to the antenna coil. The antenna coil is configured to be electromagnetically coupled to an antenna coil of the reception device.

The impedance matching part includes a parallel resonant capacitor connected in parallel with the antenna coil, and two series resonant capacitors having fixed capacitances and being connected in series to the respective opposite ends of the antenna coil. The parallel resonant capacitor and the series resonant capacitors constitute a series-parallel resonant circuit of the antenna resonance part. The parallel resonant capacitor is a variable capacitor. When the output current measured by the measurement part is a minimum or maximum value, the minimum or maximum value is used to adjust the capacity of the variable capacitor. This results in impedance matching between the transmission part and the antenna coil and optimized resonance frequency.

The impedance matching part has two damping resistors. The two damping resistors are connected in series between respective opposite ends of the antenna coil and the respective series resonant capacitors to determine the quality factor (Q factor) of the antenna resonance part.

CITATION LIST (PATENT LITERATURE)

Patent Literature 1: JP 2016-025460 A

SUMMARY OF INVENTION

Technical Problem

Ringing may occur in differential signals transmitted from the transmission part. When signals with ringing are transmitted from the transmission apparatus to the reception apparatus and demodulated by the reception apparatus, it cannot be demodulated to the original signals.

The invention has been made in view of the above circumstances. An object of the invention is to provide a transmission antenna module, a non-contact transmission module, and a non-contact communication system including the same, and a non-contact communication method, that reduces or suppresses ringing occurring in digital signals for transmission.

Solution to Problem

To solve the above problem, a transmission antenna module of an aspect of the invention includes a transmission antenna and a resistor. The transmission antenna is constituted by a metal plate, or by a conductor formed on an insulator and is configured to be electromagnetically or magnetically coupled to a reception antenna of a non-contact reception module. The resistor is connected in series to the transmission antenna. The resistor has such a resistance value that the resistor entirely blunts a waveform of a digital signal to be inputted into the resistor so as to reduce or suppress ringing occurring in the digital signal. The blunted digital signal is to be inputted into the transmission antenna.

The transmission antenna module of this aspect entirely blunts the waveform of a digital signal by allowing the digital signal to pass through the resistor, and thereby reduces or suppresses ringing occurring in the digital signal.

A non-contact transmission module according to an aspect of the invention includes the transmission antenna module and a transmitter. The transmitter may be configured to transmit the digital signal. The resistor may be connected in series between the transmission antenna and the transmitter.

The transmission antenna module of this aspect entirely blunts the waveform of a digital signal by allowing the digital signal outputted from the transmitter to pass through the resistor, and thereby reduces or suppresses ringing occurring in the digital signal.

The resistance value of the resistor may be between several ohms and hundreds of ohms. The resistance value of the resistor may be between several ohms and a hundred ohms.

The transmitter may include a first port and a second port. The transmission antenna may include a first portion and a second portion. The resistor may be provided as a plurality of the resistors including a first resistor and a second resistor. The first resistor may be connected in series between the first port of the transmitter and the first portion of the transmission antenna. The second resistor may be connected in series between the second port of the transmitter and the second portion of the transmission antenna.

The digital signal may be provided as differential signals. The transmitter may be configured to output a positive signal of the differential signals from the first port and output a negative signal of the differential signals from the second port. The first resistor may have such a resistance value that the first resistor entirely blunts the waveform of the positive signal so as to reduce or suppress ringing occurring in the positive signal outputted from the first port. The second resistor may have such a resistance value that the second resistor entirely blunts the waveform of the negative signal so as to reduce or suppress ringing occurring in the negative signal outputted from the second port. The non-contact transmission module of this aspect reduces or suppresses ringing in each of the positive and negative signals.

Alternatively, the transmitter may be configured to output a single-ended signal.

A non-contact communication system according to an aspect of the invention includes the non-contact transmission module according to any of the above aspects, and a non-contact reception module configured to perform non-contact digital communication with the non-contact transmission module. The non-contact reception module includes a reception antenna and a restorer. The reception antenna is configured to be electromagnetically or magnetically coupled to the transmission antenna of the non-contact transmission module to induce a reception signal corresponding to at least part of the blunted digital signal. The restorer is configured to restore the induced reception signal to the digital signal.

A non-contact communication method according to an aspect of the invention is a method for performing non-contact digital communication between a non-contact transmission module and a non-contact reception module. This method includes applying a digital signal to a resistor and thereby entirely blunting a waveform of the digital signal so as to reduce or suppress ringing occurring in the digital signal; and electromagnetically or magnetically coupling a transmission antenna of the non-contact transmission module and a reception antenna of the non-contact reception module, and also inputting the blunted digital signal into the transmission antenna. The transmission antenna is constituted by a metal plate or by a conductor formed on an insulator of the non-contact transmission module.

The non-contact transmission method of this aspect entirely blunts the waveform of a digital signal by allowing the digital signal to pass through the resistor, and thereby reduces or suppresses ringing occurring in the digital signal.

The non-contact transmission method may include causing a transmitter of the non-contact transmission module to transmit a digital signal and applying the digital signal to the resistor.

DESCRIPTION OF EMBODIMENTS

Figure 1:
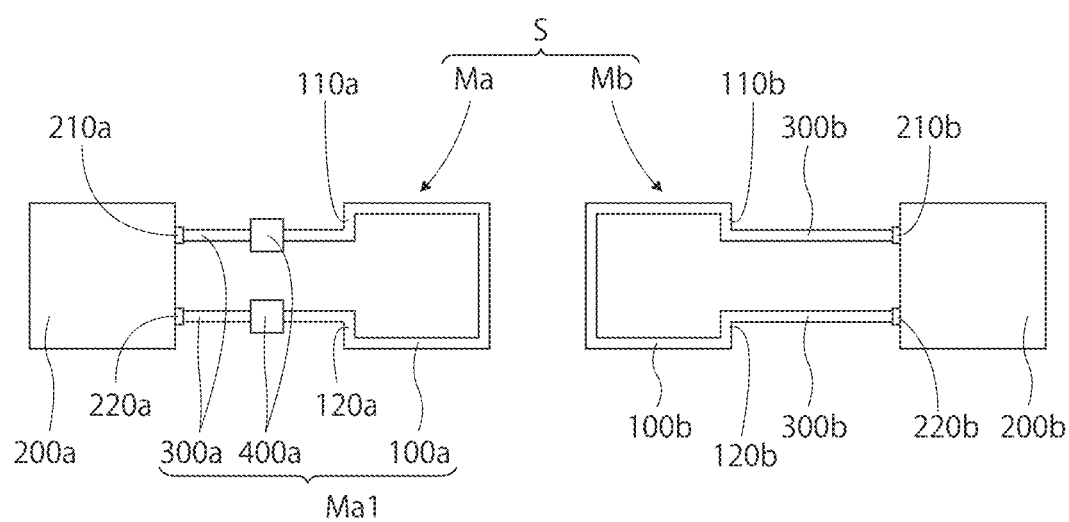
FIG. 1 is a block diagram of a non-contact communication system according to a first embodiment of the present application.

The following describes, with reference to FIG. 1, a non-contact communication system S according to a plurality of embodiments of the invention including the first embodiment. FIG. 1 shows the non-contact communication system S according to the first embodiment.

The non-contact communication system S includes a non-contact transmission module Ma (hereinafter also referred to simply as a transmission module Ma) and a non-contact reception module Mb (hereinafter also simply referred to as a reception module Mb). The transmission module Ma performs digital communication with the reception module Mb in a non-contact (wireless) manner.

The transmission module Ma includes a transmission antenna module Ma1 and a transmitter 200a. The transmission antenna module Ma1 includes a transmission antenna 100a, at least one connecting part 300a, and at least one resistor 400a. On the other hand, the reception module Mb includes a reception antenna 100b, a restorer 200b, and at least one connecting part 300b.

The transmission antenna 100a is configured to be electromagnetically or magnetically coupled to the reception antenna 100b for the digital communication. The transmission antenna 100a and the reception antenna 100b constitute a coupler C (coupler) when electromagnetically or magnetically coupled to each other. The distance (transmission distance) from the transmission antenna 100a to the reception antenna 100b when they are electromagnetically or magnetically coupled is a short distance on the order of 0 millimeters to several millimeters. The transmission distance may preferably be preset in a predetermined range. It should be noted that the transmission distance is not limited to the range described above but may theoretically be several tens of millimeters if the transmission antenna 100a, or both of the transmission antenna 100a and the reception antenna 100b, are enlarged. The transmission antenna 100a is comprised of a metal plate, or a conductor formed on an insulator. For example, in the former case, the transmission antenna 100a may have a configuration 1) or 2) below, and in the latter case, the transmission antenna 100a may have a configuration 3) or 4) below.

1) The transmission antenna 100a is formed of a metal plate, such as a lead frame, of circular or polygonal ring shape (rectangular ring shape in FIG. 1).
2) The transmission antenna 100a is formed of a metal plate of rod-like shape, L-shape, arc-shape, U-shape, spiral-shape, circular shape, or polygonal shape.
3) The transmission antenna 100a is formed of a conductor of circular or polygonal ring shape formed on an insulator such as a circuit board or a plastic block.
4) The transmission antenna 100a is formed of a conductor of rectilinear shape, L-shape, arc-shape, U-shape, spiral-shape, circular shape, or polygonal shape, formed on the above-described insulator.

The conductor may be formed on the insulator by any of the following methods a) to c). a) The conductor is formed on the insulator by a known printing method, a known photolithography process, or the like. b) The conductor is formed by forming a conductor film on the insulator by sputtering, electroless plating, or vapor deposition, followed by removal of unnecessary portions of the metal film with a laser or chemical etching. c) The conductor is formed by activating metal complexes dispersed in the insulator with a laser to form a plating catalyst on the insulator and forming a plating film (conductor) on the plating catalyst by electroless plating or the like.

The transmitter 200a is configured to transmit digital signals and constituted by a logic circuit, such as an IC, or alternatively by software to be processed by a processor. Digital signals to be transmitted by the transmitter 200a may be rectangular-wave differential signals including frequency components over a wide frequency range, or rectangular-wave single-ended signals having frequency components over a wide frequency range. Such digital signals contain high frequency components of several hundred MHz or higher, more preferably high frequency components of 1 GHz or higher. Digital signals containing high frequency components of 1 GHz or higher have sharp rises. It should be noted that digital signals transmitted from the transmitter 200a are unmodulated.

The distance between the transmitter 200a and the transmission antenna 100a may preferably be on the order of several millimeters to 200 millimeters, and more preferably on the order of several millimeters to several tens of millimeters. Where the distance is on the order of several millimeters to 200 millimeters, it is unlikely that ringing occurring in digital signals outputted from the transmitter 200a is settled before the digital signals are inputted into the transmission antenna 100a. When the distance is on the order of several millimeters to several tens of millimeters, the ringing is more unlikely to be settled. However, the distance is not limited to the above ranges. This is because, even if the distance is 200 millimeters or larger, ringing occurring in digital signals outputted from the transmitter 200a may not be settled before the digital signals are inputted into the transmission antenna 100a.

The at least one connecting part 300a connects the transmission antenna 100a and the transmitter 200a. The or each connecting part 300a may be constituted by a metal plate such as a lead frame, a pin, a lead wire, a cable, a conductive wire, and/or a conductor formed on the insulator. Where the or each connecting part 300a is a conductor on the insulator, it may have the same configuration as the transmission antenna 100a of any aspect that is a conductor on the insulator. The at least one connecting part 300a may preferably have a length appropriately set according to the above-described distance between the transmitter 200a and the transmission antenna 100a. The transmission antenna 100a and the at least one connecting part 300a may be formed of the same metal plate or of a continuous conductor on the insulator.

The at least one resistor 400a is only required to be connected in series between the transmission antenna 100a and the transmitter 200a. For example, the or each resistor 400a may be a chip resistor, a leaded resistor, or the like connected to the connecting part 300a. The or each resistor 400a has such a resistance value that the resistor 400a entirely blunts the waveforms of digital signals outputted from the transmitter 200a in order to reduce or suppress ringing occurring in the digital signals. It is found that the at least one resistor 400a also suppresses overshoot occurring in the digital signals as a result of entirely blunting the waveforms of the digital signals. In the context of the invention, the phrase "to entirely blunt the waveforms of digital signals" means to attenuate the frequency components of the digital signals over a wide frequency range. This is similar to the fact that frequency components of a digital signals are attenuated over a wide frequency range when the digital signals travels through a transmission path of a certain distance. It should be noted that the at least one resistor 400a does not constitute part of a known filter to cut a particular frequency range.

Such blunting of the overall waveforms of the digital signals will result in degradation of the overall characteristics of the digital signals. In view of this, for the purpose of minimizing degradation of the characteristics of the digital signals, the resistance value of the at least one resistor 400a may preferably be between several ohms and hundreds of ohms, more preferably between several ohms and a hundred ohms. Also, where a larger degree of ringing and/or overshoot occurs in the waveforms of the digital signals transmitted to the transmitter 200a, the at least one resistor 400a may preferably have a higher resistance value within the above range. Where a smaller degree of ringing and/or overshoot occurs, the at least one resistor 400a may preferably have a lower resistance value within the above range. Further, where the transmission distance is preset to a short distance, it is possible to increase the resistance value of the at least one resistor 400a within the above range. Where the transmission distance is preset to a long distance, it is possible to decrease the resistance value of the at least one resistor 400a within the above range.

The transmission antenna 100a may include a first portion 110a and a second portion 120a, which is a portion different from the first portion 110a, as shown in FIG. 1. For example, the first portion 110a may be a first end of the transmission antenna 100a, and the second portion 120a may be a second end of the transmission antenna 100a. Where the transmission antenna 100a includes the first portion 110a and the second portion 120a, it is possible to satisfy 1) to 3) as follows.

1) The transmitter 200a includes a first port 210a and a second port 220a.
2) There are two connecting parts 300a. One of the connecting parts 300a connects the first portion 110a of the transmission antenna 100a and the first port 210a of the transmitter 200a, and the other connecting part 300a connects the second portion 120a of the transmission antenna 100a and the second port 220a of the transmitter 200a.
3) There is provided a plurality of the resistors 400a including at least one first resistor 400a and at least one second resistor 400a. The at least one first resistor 400a is connected in series between the first portion 110a of the transmission antenna 100a and the first port 210a of the transmitter 200a, and the at least one second resistor 400a is connected in series between the second portion 120a of the transmission antenna 100a and the second port 220a of the transmitter 200a.

In FIG. 1, a single first resistor 400a is connected to the one connecting part 300a, and a single second resistor 400a is connected to the other connecting part 300a.

Where the transmitter 200a is adapted to transmit digital signals being differential signals, the transmitter 200a may be configured such that positive signals of the differential signals are outputted from the first port 210a; negative signals of the differential signals are outputted from the second port 220a; the or each first resistor 400a has such a resistance value that the first resistor 400a entirely blunts the waveforms of positive signals outputted from the first port 210a in order to reduce or suppress ringing occurring in the positive signals; and the or each second resistor 400a has such a resistance value that the second resistor 400a entirely blunts the waveforms of positive signals outputted from the first port 210a in order to reduce or suppress ringing occurring in the negative signals. The resistance values of the at least one first resistor 400a and the at least one second resistor 400a may be set as described above. These resistance values may preferably be set to the same value but may be set to different values where there is a differential imbalance between positive signals and negative signals.

Where the transmitter 200a is adapted to transmit digital signals being single-ended signals, the transmitter 200a may be configured such that digital signals are outputted from one of the first port 210a and the second port 220a, and return to the other port through the one connecting part 300a, the transmission antenna 100a, and the other connecting part 300a.

The reception antenna 100b is configured to be electromagnetically or magnetically coupled to the transmission antenna 100a to constitute the coupler C, so that reception signals corresponding to at least part of the blunted digital signals are induced. For example, the reception antenna 100*b* may be configured to be electromagnetically or magnetically coupled to the transmission antenna 100*a* to constitute the coupler C, so as to induce reception signals corresponding to components obtained by differentiating the digital signals with respect to time. The components are high frequency components included in the waveforms of the blunted digital signals. The reception antenna 100*b* may be constituted by a metal plate, or a conductor formed on an insulator, as in the transmission antenna 100*a*, but may be modified in any manner as long as it has the configuration described above.

The restorer 200*b* is configured to receive induced reception signals through the reception antenna 100*b*, restore the induced reception signals into the original digital signals, and output the original digital signals. The restorer 200*b* is constituted by a logic circuit, such as an IC, or alternatively by software to be processed by a processor. The restorer 200*b* may be, for example, a comparator circuit or the like having hysteresis characteristics. Although the blunted digital signals have degraded characteristics as described above, the deterioration is suppressed to the minimum degree, so that the deterioration does not substantially affect the restoration process by the restorer 200*b*.

The at least one connecting part 300*b* connects the reception antenna 100*b* and the restorer 200*b*. The or each connecting part 300*b* may be constituted by a metal plate such as a lead frame, a pin, a lead wire, a cable, a conductive wire, and/or a conductor formed on the insulator. Where the or each connecting part 300*b* is a conductor on the insulator, it may have the same configuration as the transmission antenna 100*a* of any aspect that is a conductor on the insulator. The reception antenna 100*b* and the at least one connecting part 300*b* may be formed of the same metal plate or of a continuous conductor on the insulator.

As in the transmission antenna 100*a*, the reception antenna 100*b* may include a first portion 110*b* and a second portion 120*b*, which is a portion different from the first portion 110*b*. In this case, it is possible to satisfy 1) and 2) as follows. 1) The restorer 200*b* has a first port 210*b* and a second port 220*b*. 2) There are two connecting parts 300*b*. One of the connecting parts 300*b* connects the first portion 110*b* of the reception antenna 100*b* and the first port 210*b* of the restorer 200*b*, and the other connecting part 300*b* connects the second portion 120*b* of the reception antenna 100*b* and the second port 220*b* of the restorer 200*b*.

The following provides a detailed description of a method for performing digital communication using the non-contact communication system S described above. Where digital signals transmitted from the transmitter 200*a* are single-ended signals, the transmitter 200*a* of the transmission module Ma transmits the digital signals. The digital signals outputted from the transmitter 200*a* are applied to the at least one connecting part 300*a* and the at least one resistor 400*a*. Application of the digital signals to the at least one resistor 400*a* results in that the waveforms of the digital signals are entirely blunted, so that ringing occurring in the digital signals is reduced or suppressed. The blunted digital signals are inputted into the transmission antenna 100*a*.

The transmission antenna 100*a* of the transmission module Ma and the reception antenna 100*b* of the reception module Mb are brought closer to each other, to be at such a short distance as described above from each other. As a result, the transmission antenna 100*a* and the reception antenna 100*b* are electromagnetically or magnetically coupled to each other to constitute the coupler C. In this state, induced to the reception antenna 100*b* are reception signals corresponding to the components obtained by differentiating the blunted digital signals with respect to time. The components are high frequency components included in the waveforms of the blunted digital signals.

The induced reception signals are inputted into the restorer 200*b*, and the restorer 200*b* restores such signals to the original digital signals. The restored digital signals are outputted from the restorer 200*b* to a signal processing circuit (not shown).

Where the digital signals transmitted from the transmitter 200*a* are differential signals, the positive signals of the differential signals outputted from the transmitter 200*a* is applied to the one connecting part 300*a* and the at least one first resistor 400*a*, while the negative signals of the differential signals outputted from the transmitter 200*a* is applied to the other connecting part 300*a* and the at least one second resistor 400*a*. The positive signals are applied to the at least one first resistor 400*a* to blunt the waveforms of the positive signals entirely, so that ringing occurring in the positive signals is reduced or suppressed. The negative signals are applied to the at least one second resistor 400*a* to blunt the waveforms of the negative signals entirely, so that ringing occurring in the negative signals is reduced or suppressed. The blunted positive signals and the blunted negative signals are inputted into the transmission antenna 100*a*.

With the transmission antenna 100*a* and the reception antenna 100*b* electromagnetically or magnetically coupled to each other as described above, induced to the reception antenna 100*b* are reception signals corresponding to the components obtained by differentiating the blunted positive and negative signals with respect to time. The components are high frequency components included in the waveforms of the blunted positive and negative signals.

The induced reception signals are inputted into the restorer 200*b*, and the restorer 200*b* restores the induced reception signals to digital signals corresponding to the original differential signals. The restored digital signals are outputted from the restorer 200*b* to the signal processing circuit.

Here, Experiments 1, 2, and 3 were conducted in the following manner. Experiments 1 to 3 used an evaluation circuit board as described below. On the evaluation circuit board, a transmitter being an IC is mounted, and two transmission paths are formed. One of the two transmission paths is connected to a first port of the transmitter, and the other is connected to a second port. Each of the two transmission paths has a probing point. As such, the two transmission paths are not connected to the transmission antenna 100*a*. Digital signals transmitted from the transmitter are rectangular-wave differential signals including frequency components over a wide frequency range, and their signal speed is 1.5 Gbps. In Experiment 1, no resistors are connected on the transmission paths. In other words, the resistor of the invention does not exist in Experiment 1. In Experiment 2, a resistor of 10 ohms is connected to each of the transmission paths. In other words, a resistor of 10 ohms is connected in series between the transmitter and a respective probing point. In Experiment 3, a resistor of 50 ohms is connected to each of the transmission paths. In other words, a resistor of 50 ohms is also connected in series between the transmitter and a respective probing point.

Figure 2A:
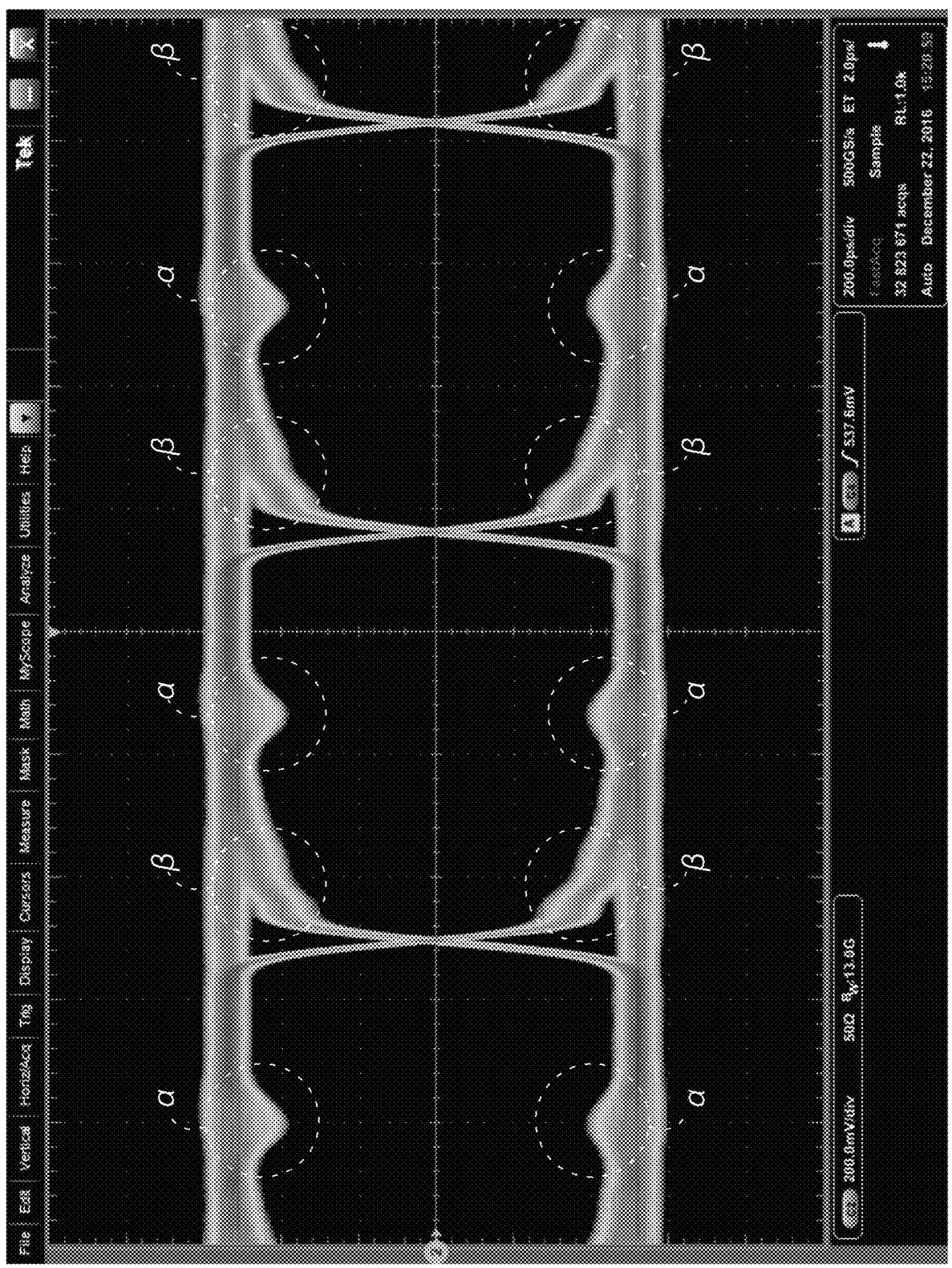
FIG. 2A is a waveform diagram showing waveforms of digital signals measured in Experiment 1.
Figure 2B:
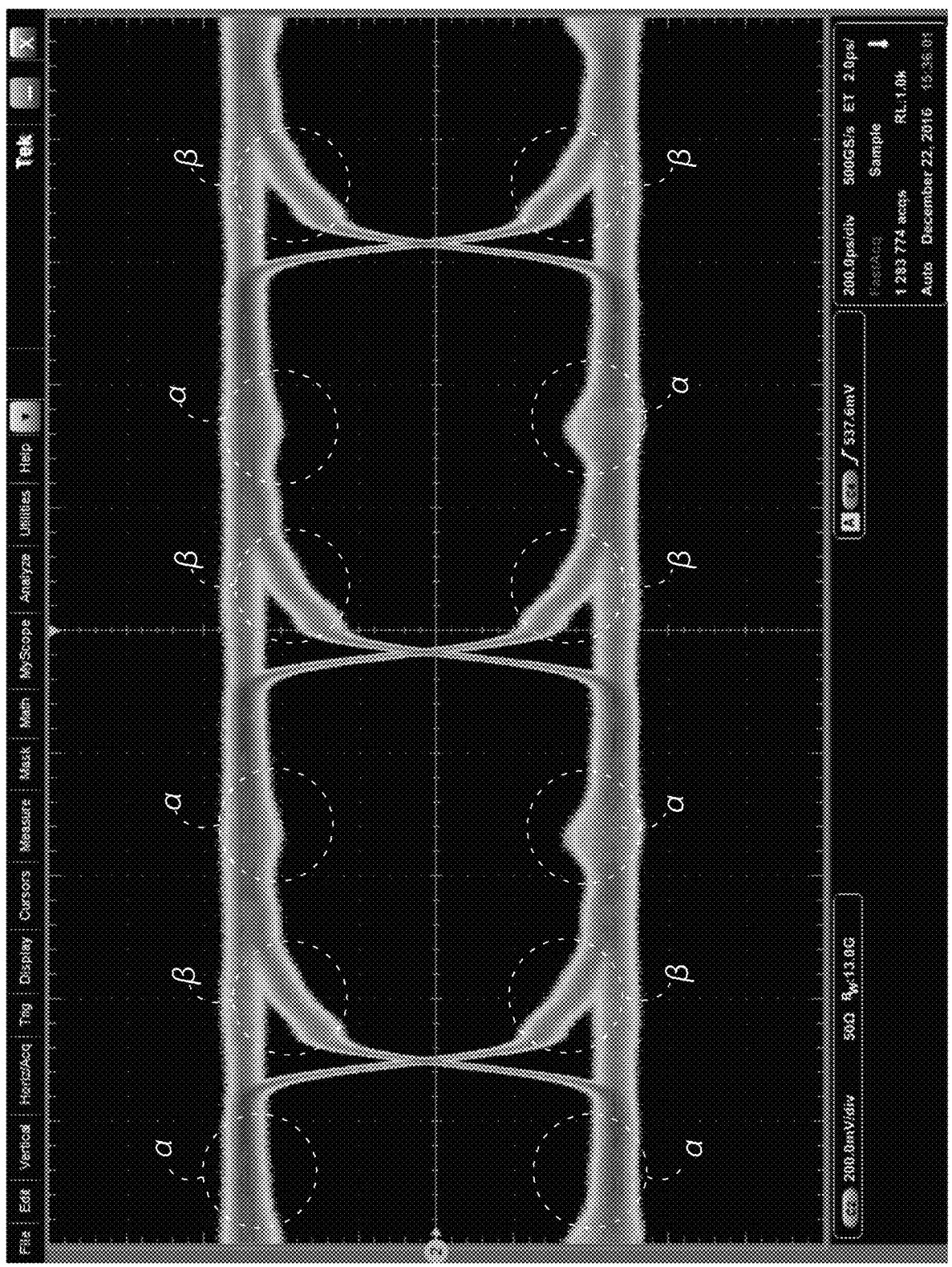
FIG. 2B is a waveform diagram showing waveforms of digital signals measured in Experiment 2.
Figure 2C:
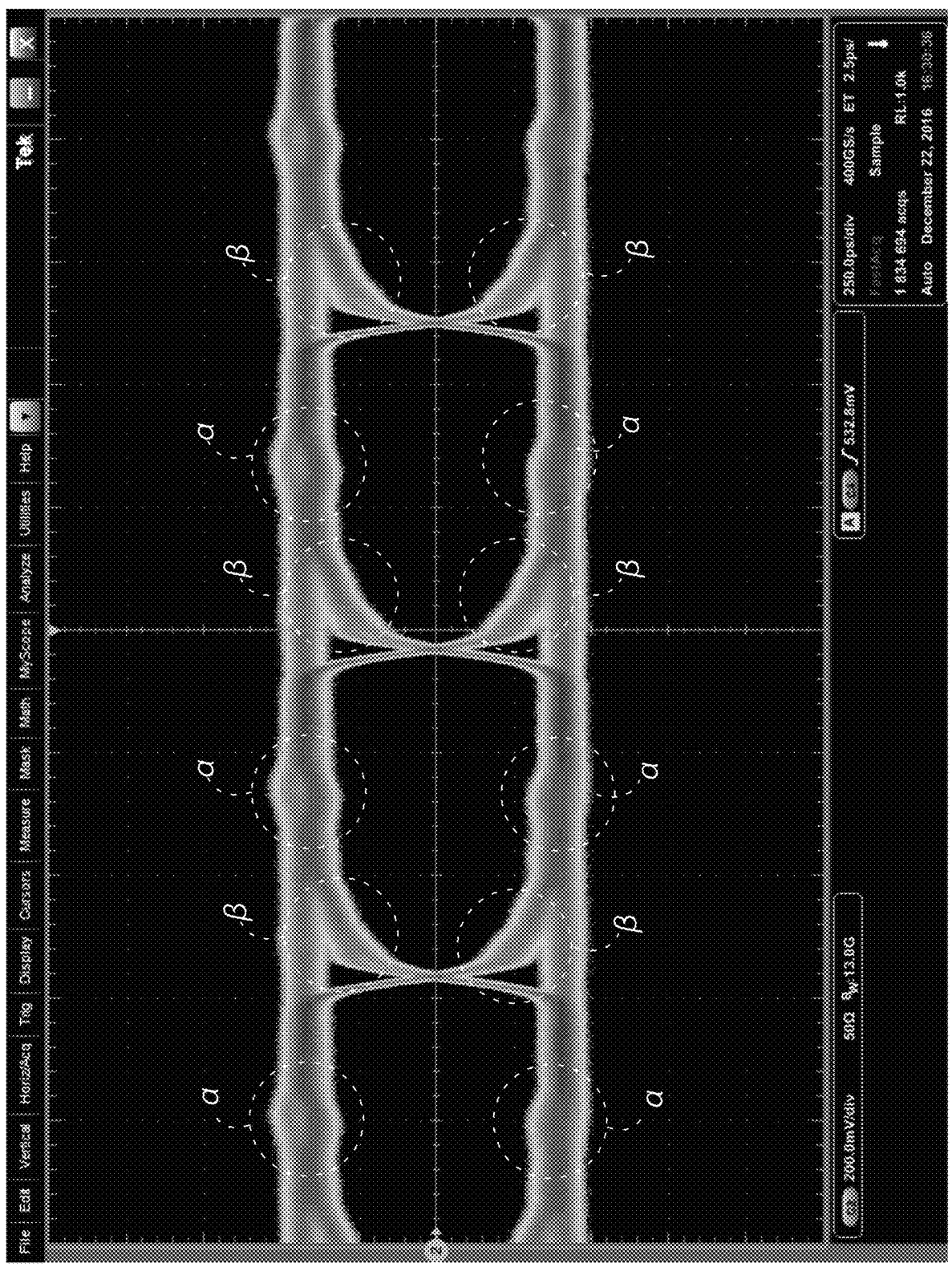
FIG. 2C is a waveform diagram showing waveforms of digital signals measured in Experiment 3.

FIG. 2A shows the result of Experiment 1, which shows that in the waveforms of digital signals measured at the probing point, significant ringing occurs in portions α, and ringing occurs also in the portions β. FIG. 2B shows the result of Experiment 2, which shows that in the waveforms of the digital signals measured at the probing points, the ringing that has occurred in portions α and β are reduced. FIG. 2C shows the result of Experiment 3, which shows that in the waveforms of the digital signals measured at the probing points, the ringing that has occurred in portions α and β are reduced further.

On the other hand, it can be seen that the waveforms of the digital signals shown in FIG. 2B, as a result of being blunted entirely by the 10-ohm resistors, have line widths smaller than those of the waveforms of the digital signals shown in FIG. 2A; and that the waveforms of the digital signals shown in FIG. 2C, as a result of being blunted entirely by the 50-ohm resistors, have line widths smaller than those of the waveforms of the digital signals shown in FIG. 2B. It can be thus seen that the resistors attenuate frequency components of the digital signals over a wide frequency range.

The non-contact communication system S and the non-contact transmission module Ma as described above provide the following technical features and effects. First, digital signals transmitted from the transmitter $200a$ of the transmission module Ma are passed through the at least one resistor $400a$ so as to entirely blunt the waveforms of the digital signals. This reduces or suppresses ringing and/or overshoot occurring in digital signals transmitted from the transmitter $200a$ of the transmission module Ma. Therefore, when digital signals are transmitted from the transmission antenna $100a$ of the transmission module Ma to the reception antenna $100b$ of the reception module Mb, high frequency components of the digital signals are restored more accurately to the original digital signals by the restorer $200b$ of the reception module Mb. This stabilizes non-contact communication between the transmission module Ma and the reception module Mb.

Second, it is possible to avoid increasing the number of components of the transmission module Ma and/or increasing the complexity of the circuit design for the purpose of reducing or suppressing ringing and/or overshoot occurring in digital signals. This purpose is fulfilled simply by connecting the at least one resistor $400a$ in series between the transmitter $200a$ and the transmission antenna $100a$.

Third, where digital signals transmitted from the transmitter $200a$ are differential signals, the positive signals of the differential signals are passed through the at least one first resistor $400a$, so that ringing that occurs in the positive signals is reduced or suppressed, while the negative signals generated are passed through the at least one second resistor $400a$, so that ringing that occurs in the negative signals is reduced or suppressed.

The non-contact communication systems, transmission modules, and reception modules described above are not limited to the above embodiments, but may be modified in any manner within the scope of the claims.

The number of transmission antennas of the non-contact transmission module of the invention is at least one and may be a plural number. For example, two transmission antennas $100a$ may be provided, one of which may be connected to one of the connecting parts $300a$, and the other of which may be connected to the other connecting part $300a$.

The resistor of the non-contact transmission module of the invention may be modified in any manner as long as it entirely blunts waveforms of digital signals. For example, the resistor of the invention may be a portion of the connecting part that is made of a material having a resistance value in the range described above. Alternatively, the resistor of the invention having a resistance value in the range described above may be provided by narrowing a portion of the connecting part or by increasing the length of the connecting part. Thus, the resistor of the non-contact transmission module of the invention is not limited to a chip resistor and a leaded resistor.

The invention encompasses a case where another electronic component, such as a capacitor or a coil, is connected between the transmission antenna and the resistor, or between the resistor and the transmitter. As described for the above embodiments, it may be only a resistor or resistors that is connected between the transmission antenna and the transmitter.

The invention encompasses a case where the transmission antenna module and the transmitter are separately provided, and in use, the transmitter may be connected to the at least one connecting part of the transmission antenna module.

It should be appreciated that the materials, the shapes, the dimensions, the number, the arrangements, etc. of the constituting elements of the non-contact communication systems, the transmission modules, and the reception modules in the above-described embodiments and their variants are presented by way of example only and may be modified in any manner as long as the same functions can be fulfilled. The aspects and variants of the above-described embodiments can be combined in any possible manner.

REFERENCE SIGNS LIST

[S: non-contact communication system
  Ma: non-contact transmission module
    Ma1: transmission antenna module
      $100a$: transmission antenna
        $110a$: first portion
        $120a$: second portion
      $400a$: resistor (first resistor and second resistor)
      $300a$: connecting part
    $200a$: transmitter
      $210a$: first port
      $220a$: second port
  Mb: non-contact reception module
    $100b$: reception antenna
      $110b$: first portion
      $120b$: second portion
    $200b$: restorer
      $210b$: first port
      $220b$: second port
    $300b$: connecting part

What is claimed is:

1. A non-contact transmission module comprising:
a transmission antenna module; and
a transmitter configured to transmit a digital signal containing high frequency components of a plurality of hundred MHz or higher,
wherein the transmission antenna module includes
a transmission antenna constituted by a metal plate, or by a conductor formed on an insulator, the transmission antenna being configured to be electromagnetically or magnetically coupled to a reception antenna of a non-contact reception module, wherein a distance between the transmitter and the transmission antenna is between a plurality of millimeters and 200 millimeters, and
at least one resistor connected in series between the transmission antenna and the transmitter, the at least one resistor having such a resistance value that the at least one resistor attenuates, over the entire frequency range, frequency components of the digital signal to be inputted into the at least one resistor so as to reduce or suppress ringing occurring in the digital signal, wherein the transmission antenna module is configured to input the digital signal with the frequency components thereof attenuated over the entire frequency range, directly into the transmission antenna from the at least one resistor, and wherein the resistance value of the at least one resistor is between several ohms and hundreds of ohms.

2. The non-contact transmission module according to claim 1, wherein the transmitter includes a first port and a second port, the transmission antenna includes a first portion and a second portion, the at least one resistor comprises a plurality of the resistors including at least one first resistor and at least one second resistor, the at least one first resistor is connected in series between the first port of the transmitter and the first portion of the transmission antenna, and the at least one second resistor is connected in series between the second port of the transmitter and the second portion of the transmission antenna.

3. The non-contact transmission module according to claim 1, wherein the transmitter is configured to output a single-ended signal.

4. The non-contact transmission module according to claim 2, wherein the transmitter is configured to output a single-ended signal.

5. A non-contact communication system comprising:

the non-contact transmission module according to claim 1; and a non-contact reception module configured to perform non-contact digital communication with the non-contact transmission module, wherein the transmitter includes a first port and a second port, the transmission antenna includes a first portion and a second portion, the at least one resistor comprises a plurality of the resistors including at least one first resistor and at least one second resistor, the at least one first resistor is connected in series between the first port of the transmitter and the first portion of the transmission antenna, the at least one second resistor is connected in series between the second port of the transmitter and the second portion of the transmission antenna, the digital signal comprises differential signals, the transmitter is configured to output a positive signal of the differential signals from the first port and output a negative signal of the differential signals from the second port, the at least one first resistor has such the resistance value that the at least one first resistor entirely blunts the waveform of the positive signal so as to reduce or suppress ringing occurring in the positive signal outputted from the first port, and the at least one second resistor has such the resistance value that the at least one second resistor entirely blunts the waveform of the negative signal so as to reduce or suppress ringing occurring in the negative signal outputted from the second port, and wherein the non-contact reception module includes a reception antenna configured to be electromagnetically or magnetically coupled to the transmission antenna of the non-contact transmission module to induce a reception signal corresponding to at least part of the blunted digital signal, and a restorer configured to restore the induced reception signal to the digital signal.

6. A non-contact communication system comprising:

the non-contact transmission module according to claim 1; and a non-contact reception module configured to perform non-contact digital communication with the non-contact transmission module, wherein the transmitter is configured to output a single-ended signal, and wherein the non-contact reception module includes a reception antenna configured to be electromagnetically or magnetically coupled to the transmission antenna of the non-contact transmission module to induce a reception signal corresponding to at least part of the attenuated digital signal, and a restorer configured to restore the induced reception signal to the digital signal.

7. A non-contact transmission method comprising: applying a digital signal to at least one resistor having a resistance value and thereby entirely attenuating, over the entire frequency range, frequency components of the digital signal so as to reduce or suppress ringing occurring in the digital signal, wherein the at least one resistor is connected in series to a transmission antenna and the transmission antenna is configured to be electromagnetically or magnetically coupled to a reception antenna of a non-contact reception module; and inputting the digital signal, with the frequency components thereof attenuated over the entire frequency range, directly into the transmission antenna from the at least one resistor, wherein the resistance value of the at least one resistor is between several ohms and hundreds of ohms, the applying of the digital signal includes applying the digital signal, which has been transmitted from a transmitter and contains high frequency components of a plurality of hundred MHz or higher, to the at least one resistor, and a distance between the transmitter and the transmission antenna is between a plurality of millimeters and 200 millimeters.

8. The non-contact communication method according to claim 7, wherein the inputting of the digital signal into the transmission antenna includes electromagnetically or magnetically coupling a transmission antenna of the non-contact transmission module and a reception antenna of the non-contact reception module, wherein the transmission antenna is constituted by a metal plate or by a conductor formed on an insulator of the non-contact transmission module.

* * * * *